United States Patent
Bauckman et al.

(10) Patent No.: US 11,607,760 B2
(45) Date of Patent: *Mar. 21, 2023

(54) METHODS, SYSTEMS, AND DEVICES FOR PROVIDING COMMUNICATIONS CAPABILITIES TO EQUIPMENT OF SWIMMING POOLS AND SPAS

(71) Applicant: ZODIAC POOL SYSTEMS LLC, Carlsbad, CA (US)

(72) Inventors: Mark J. Bauckman, San Marcos, CA (US); Eugene Keith McQueen, Vista, CA (US); Tawny Jean Cothran, Oceanside, CA (US)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 293 days.

This patent is subject to a terminal disclaimer.

(21) Appl. No.: 16/808,548

(22) Filed: Mar. 4, 2020

(65) Prior Publication Data

US 2020/0198068 A1      Jun. 25, 2020

Related U.S. Application Data

(63) Continuation of application No. 15/665,754, filed on Aug. 1, 2017, now Pat. No. 10,618,136, which is a
(Continued)

(51) Int. Cl.
*B23P 19/04* (2006.01)
*F04B 49/06* (2006.01)
(Continued)

(52) U.S. Cl.
CPC ............... *B23P 19/04* (2013.01); *E04H 4/12* (2013.01); *F04B 49/065* (2013.01); *G08C 17/02* (2013.01);
(Continued)

(58) Field of Classification Search
CPC ..................................................... B01D 21/24
See application file for complete search history.

(56) References Cited

U.S. PATENT DOCUMENTS

| | | | | |
|---|---|---|---|---|
| 5,100,542 A | * | 3/1992 | Landman | ............... C02F 1/686 |
| | | | | 210/136 |
| 6,651,454 B1 | | 11/2003 | Spiegel | |

(Continued)

FOREIGN PATENT DOCUMENTS

| | | | | |
|---|---|---|---|---|
| EP | 0674154 A1 | * | 9/1995 | ............... G01F 1/34 |
| WO | 03100153 | | 12/2003 | |

(Continued)

OTHER PUBLICATIONS

U.S. Appl. No. 14/205,400, Final Office Action dated Apr. 12, 2016, 19 pages.
(Continued)

*Primary Examiner* — Nabil H Syed
*Assistant Examiner* — Cal J Eustaquio
(74) *Attorney, Agent, or Firm* — Kilpatrick Townsend & Stockton LLP

(57) ABSTRACT

Communications capabilities are supplied to components of pool water recirculation systems, even if the components lack electrical power or supply wires. Capabilities may be furnished by wireless RF devices that connect to existing fittings or ports of the components, for example. The devices are configured to obtain desired information relating to the components (or the water within them) and transmit the information remotely for processing or consideration.

7 Claims, 4 Drawing Sheets

Related U.S. Application Data continuation of application No. 14/205,400, filed on Mar. 12, 2014, now abandoned.

(60) Provisional application No. 61/779,552, filed on Mar. 13, 2013.

(51) Int. Cl.
*H04Q 9/00* (2006.01)
*E04H 4/12* (2006.01)
*G08C 17/02* (2006.01)
*C02F 103/42* (2006.01)

(52) U.S. Cl.
CPC ........... *H04Q 9/00* (2013.01); *C02F 2103/42* (2013.01); *C02F 2209/008* (2013.01); *C02F 2209/03* (2013.01); *E04H 4/1245* (2013.01); *H04Q 2209/43* (2013.01); *H04Q 2209/50* (2013.01); *Y10T 29/49826* (2015.01)

(56) References Cited

U.S. PATENT DOCUMENTS

| | | | |
|---|---|---|---|
| 7,069,883 | B2 | 7/2006 | Atkins et al. |
| 10,618,136 | B2 | 4/2020 | Bauckman et al. |
| 2004/0138840 | A1 | 7/2004 | Wolfe |
| 2006/0201556 | A1* | 9/2006 | Hamza ............... A61H 33/6073 137/526 |
| 2007/0154322 | A1 | 7/2007 | Stiles, Jr. et al. |
| 2007/0163929 | A1* | 7/2007 | Stiles .................... F04B 49/20 210/97 |
| 2010/0092308 | A1 | 4/2010 | Stiles, Jr. et al. |
| 2011/0025511 | A1 | 2/2011 | Wien |
| 2012/0053737 | A1 | 3/2012 | Valluri et al. |
| 2012/0111799 | A1* | 5/2012 | Lemoine ............ G01N 33/1886 210/739 |
| 2012/0185571 | A1 | 7/2012 | Uy |
| 2014/0027359 | A1 | 1/2014 | Stiles, Jr. et al. |
| 2014/0259612 | A1 | 9/2014 | Bauckman et al. |

FOREIGN PATENT DOCUMENTS

| | | |
|---|---|---|
| WO | 2004010096 | 1/2004 |
| WO | 2014164939 | 10/2014 |

OTHER PUBLICATIONS

U.S. Appl. No. 14/205,400, Non-Final Office Action dated Feb. 9, 2017, 12 pages.
U.S. Appl. No. 14/205,400, Non-Final Office Action dated Nov. 10, 2015, 14 pages.
U.S. Appl. No. 14/205,400, Non-Final Office Action dated Jun. 21, 2017, 15 pages.
U.S. Appl. No. 14/205,430, Non-Final Office Action dated Dec. 4, 2015, 5 pages.
U.S. Appl. No. 15/665,754, Final Office Action dated Jun. 12, 2018, 14 pages.
U.S. Appl. No. 15/665,754, Non-Final Office Action dated Nov. 22, 2017, 10 pages.
U.S. Appl. No. 15/665,754, Notice of Allowance dated Jan. 16, 2020, 7 pages.
Australian Application No. 2014248819, First Examiner Report dated Feb. 13, 2017, 5 pages.
International Application No. PCT/US2014/023836, International Search Report and Written Opinion dated Aug. 6, 2014, 12 pages.

* cited by examiner

METHODS, SYSTEMS, AND DEVICES FOR PROVIDING COMMUNICATIONS CAPABILITIES TO EQUIPMENT OF SWIMMING POOLS AND SPAS

CROSS REFERENCE TO RELATED APPLICATIONS

This application is a continuation of allowed U.S. patent application Ser. No. 15/665,754, filed Aug. 1, 2017, entitled "Methods, Systems, and Devices for Providing Communications Capabilities to Equipment of Swimming Pools and Spas," which is a continuation of abandoned U.S. patent application Ser. No. 14/205,400, filed Mar. 12, 2014, having the same title, which claims the benefit of and priority to U.S. Provisional Patent Application No. 61/779,552, filed Mar. 13, 2013, entitled "Means for Providing Internet Connectivity to Swimming Pool Equipment," the entire contents of each of which are incorporated herein by this reference.

FIELD OF THE INVENTION

This invention relates to methods of establishing communications with equipment and more particularly, but not necessarily exclusively, to methods, systems, and devices for retrofitting or otherwise furnishing to pool and spa equipment capabilities of communicating via radio frequency signals or otherwise.

BACKGROUND OF THE INVENTION

Equipment such as pumps and filters, for example, are typically included as components of water-recirculation systems of swimming pools and spas. Historically, this equipment has lacked any electronic communications capabilities. Indeed, some components of these water-recirculation systems may lack even an electrical supply, wholly preventing them from communicating electronically.

More recently, users of pools and spas have realized that ability to adjust operations of pool and spa equipment remotely may have benefit to them in numerous situations. Commonly-owned U.S. Patent Application Publication No. 2012/0185571 of Uy details certain systems and methods for doing so. Some systems of the Uy application include a computerized controller and a networking device configured to transfer signals between transmit-capable pool equipment, on the one hand, and mobile or fixed control devices such as laptop or desktop computers or conventional smart phones (as examples). The mobile or fixed control devices may be remote from the pool equipment, furthermore, and signals may be transmitted via the Internet if appropriate or desired.

Although systems and methods of the Uy application are commercially successful, they do not resolve the problem of furnishing signal-transmission and -receipt capabilities to pool equipment that, as made or deployed, lacks such capabilities. The systems and methods further do not address supplying wireless signal-transmission and -receipt competencies to this equipment.

U.S. Patent Application Publication No. 2014/0027359 of Stiles, Jr., et al., discloses an example of a pumping system in which a controller controls operation of a motor of the system. The controller, motor, and pump may form a single unit, or the controller may be mounted onto a housing for the motor and pump. Sensors may be "operatively connected" to the controller to "provide . . . sensory information thereto." See Stiles, Jr., col. 3, ¶¶0027-28. No other "communication" appears contemplated by the system of the Stiles, Jr., application, however, nor is any radio frequency (RF) or other wireless signal-transmission and -receipt ability ascribed to any component of the system.

Internet connectivity with an equipment pad at a pool currently is limited to certain products with built-in control systems or that connect to a master control system via electrical wires. The master control system may, in turn, connect wirelessly to the Internet via a router. Missing, however, is any solution for connecting to the Internet any components lacking electrical power or electrical supply wires.

SUMMARY OF THE INVENTION

The present invention provides such a solution. Available both for new manufactures and for retrofitting existing equipment, the present invention provides communications capabilities to components that may lack electrical power or supply wires. Devices of the invention preferably may be easily configurable by homeowners or other users or servicers of pools and spas as well.

At least some versions of the invention include wireless RF devices that connect to various types of pool equipment through (preferably existing) fittings, ports, or other attachment or access locations. For example, certain of these devices may be screwed or otherwise inserted into existing drain ports of pumps or pressure gauges of filter housings. The devices are capable of obtaining desired information and transmitting it remotely for direct or indirect connection to the Internet. Alternatively or additionally, they may receive information and act responsively (as by actuating another device, for example). The devices beneficially may be low-power, battery-operated digital devices, although other devices—and other power-generating means (e.g. solar power, water turbines, piezoelectric devices, etc.) may be employed instead.

Communications protocols such as ZigBee and ZWave are commonly used in home automation systems to interconnect low-power components in a wireless network within the home. The network may be connected to the Internet through a wireless gateway or other device. Devices of the present invention may be compatible with these or other communications protocols. Although wireless RF devices are presently preferred, wired devices or wireless devices signalling in other manners (e.g. laser, ultrasonic, sonic, infrared, ultraviolet, optically, etc.) may alternatively or additionally be used. The devices also may transmit self-identifying information or information relating to their locations in a pool water-circulation system.

Once inserted and operational, devices of the invention may gather and transmit various types of information. Non-limiting examples of such information include such things as filter housing pressure, pump housing pressure (including decreased pressure or "vacuum"), pump or filter turbidity, chemical characteristics of pool or spa water, water temperature, water flow rate, number of on/off cycles of the recirculating system, or run time (either for a cycle or aggregated over multiple cycles) of the system. In particular, pressure readings obtained of water in a circulating system may allow for calculation or other determination of pump performance over time. By passing some or all of the information to the Internet, it may be processed or accessible remote from the pool equipment pad and, if appropriate, result in operational adjustments being made or suggested.

It thus is an optional, non-exclusive object of the present invention to provide communications capabilities to components that may lack electrical power or supply wires.

It is another optional, non-exclusive object of the present invention to provide communications capabilities to such components of water-recirculation systems of swimming pools and spas.

It is also an optional, non-exclusive object of the present invention to provide wireless RF devices that mechanically connect to such components through existing fittings, ports, or other attachment or access locations.

It is a further optional, non-exclusive object of the present invention to provide wireless devices capable of gathering information about the component, system, or water of the system and transmitting it remotely.

Other objects, features, and advantages of the present invention will be apparent to those skilled in appropriate fields with reference to the remaining text and the drawings of this application.

DETAILED DESCRIPTION

Figure 1:
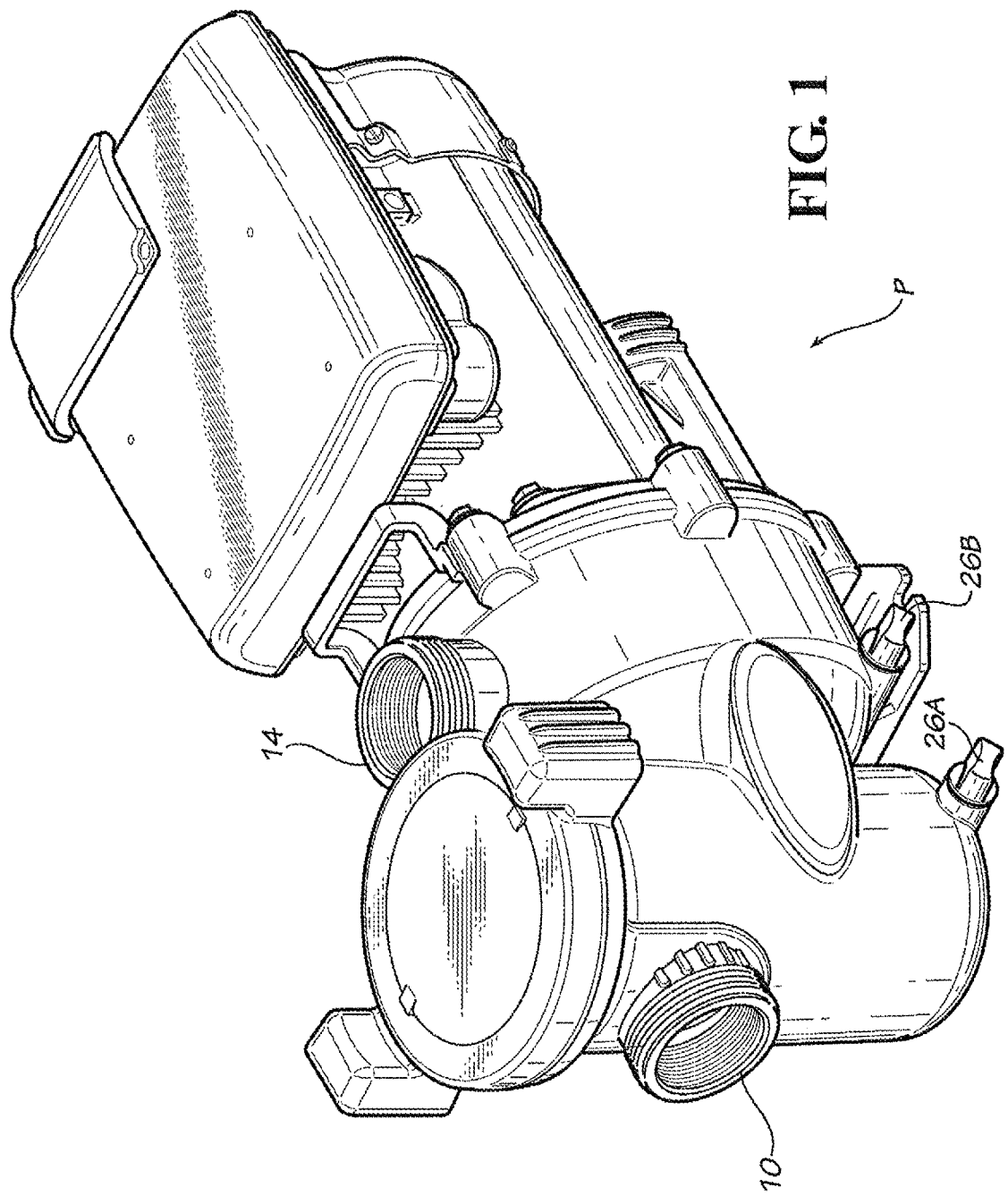
FIG. 1 is a perspective view of a pump useful as part of a pool water recirculation system with exemplary devices of the present invention connected to its drainage ports.
Figure 2:
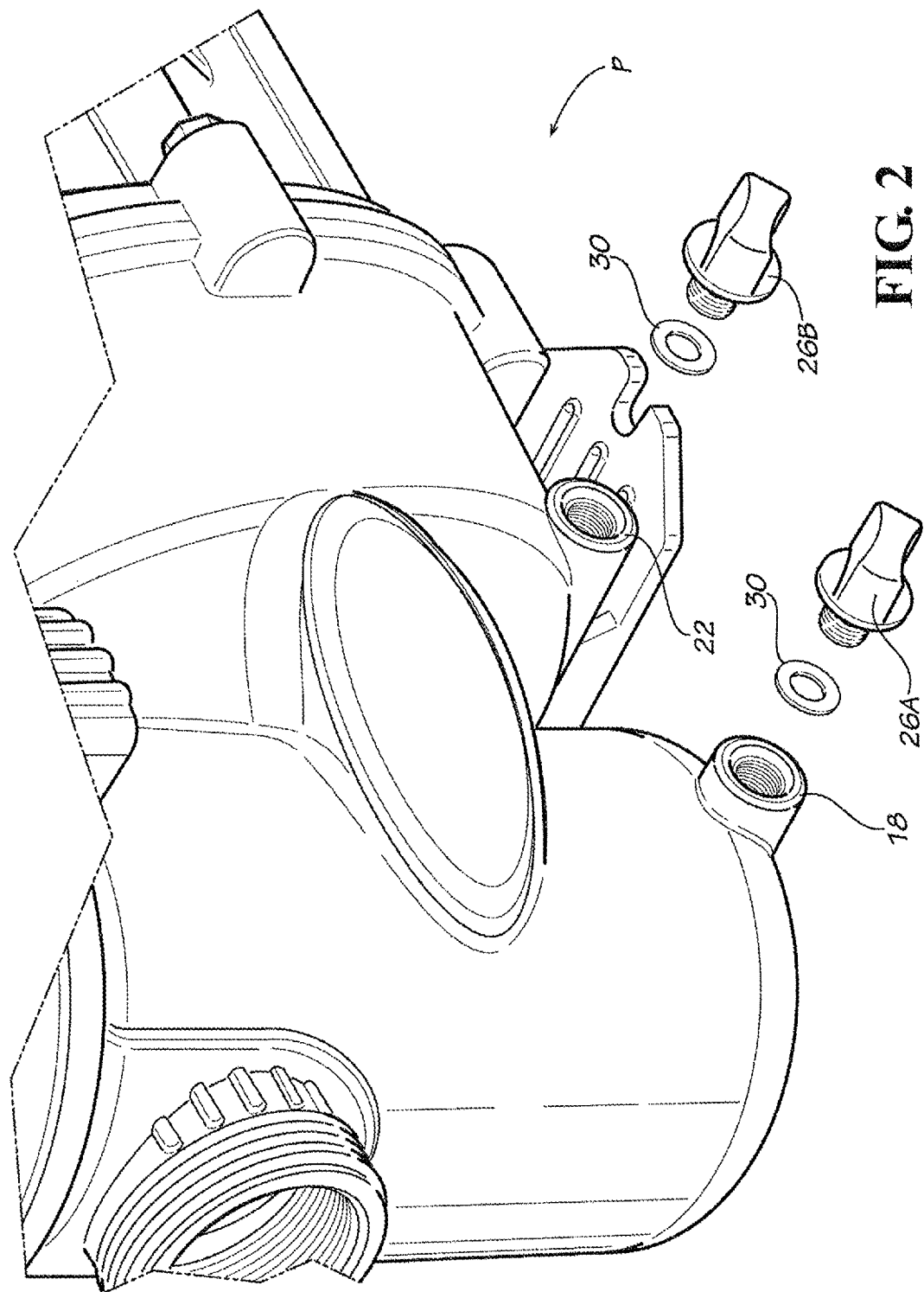
FIG. 2 is a perspective view of a portion of the pump, and a partly-exploded view of the exemplary devices, of FIG. 1.

Depicted in FIGS. 1-2 is a pump P useful in a water-recirculation system. Pump P may be conventional, as the present invention is especially adapted for retrofitting existing components with communications capabilities. Pump P need not be conventional, however, as the present invention is not limited to use with existing products or even with pumps.

The conventional pump P of FIGS. 1-2 includes inlet 10 and outlet 14. Included within pump P may be such things as a strainer basket, an impeller, and a motor. In use, the motor turns the impeller, drawing water through inlet 10, the strainer basket, and the impeller before exiting via outlet 14. The water-flow path between inlet 10 and the impeller is typically called the "vacuum side" of pump P, whereas the path between the impeller and outlet 14 is frequently referred to as the "pressure side" of the pump P.

Conventionally, pump P includes drainage ports 18 and 22 on its "wet end." Port 18 is present on the "vacuum side" of the pump P, whereas port 22 is in the "pressure side" path of water within the pump P. When pump P is not in use, port 18 may be used to drain water that has passed through inlet 10 and the strainer basket but not yet entered the impeller. By contrast, port 22 may be employed to drain water that has passed through the impeller but not yet exited outlet 14. Ports 18 and 22 traditionally are threaded so as to receive threaded plugs, with the plugs configured to seal the ports 18 and 22 (at least) when pump P is in use. For drainage, the plugs simply may be unscrewed so as to expose the ports 18 and 22.

As the strainer basket fills with debris, the vacuum pressure (i.e. the reduction in pressure below ambient) increases in the region between the strainer basket and the impeller. Hence, measuring vacuum pressure in this region as a function of time may be beneficial. Because port 18 already exists in this region, configuring a vacuum-pressure probe to fit in the port 18 likewise would be beneficial.

Similarly, obtaining pressure measurements over time on the "pressure side" of pump P may be advantageous. Together with the vacuum pressure measurements and, perhaps, other data (e.g. motor speed), various important characteristics of the water-recirculation system may be calculated, deduced, or otherwise determined. As (non-limiting) examples, system characteristics such as water-flow rate and energy usage could be determined.

Illustrated in FIGS. 1-2 are devices 26A and 26B consistent with the present invention. Devices 26A and 26B are configured to fit within ports 18 and 22, respectively, replacing conventional drain plugs. In the exemplary versions shown, therefore, devices 26A and 26B are threaded, may be used together with washers, gaskets, or o-rings 30 if desired to facilitate sealing of the ports 18 and 22, and have at least portions of their bodies positioned externally of pump P. Devices 26A and 26B need not be threaded or shaped, configured, or positioned as depicted, however, as will be apparent to persons skilled in the relevant art.

Unlike conventional drain plugs, devices 26A and 26B include sensors and, preferably, wireless RF transmitters. Alternatively, one or both of devices 26A and 26B could communicate via wire or other medium either remotely or one to the other or use other carrier means such as laser, ultrasonic, sonic, infrared, ultraviolet, or optics signals. In some cases either or both of devices 26A and 26B could include wireless or wired receivers as well.

In presently-preferred versions of the invention, devices 26A and 26B include pressure gauges so as to sense and measure pressures at ports 18 and 22. The gauges may be transducers so as to convert mechanical energy to electrical energy. Transmitters within devices 26A and 26B transmit the pressures, preferably doing so either continuously or periodically over a predetermined or determinable interval of time. Each of the gauges and transmitters may itself be conventional as long as it is capable of functioning adequately within device 26A or 26B. The devices 26A and 26B further may if desired be low-power digital devices including batteries or other power sources.

Devices 26A and 26B may be part of a network of devices, including similar devices deployed in fittings or ports of (or otherwise in connection with) other components of water-recirculation systems. If desired they may transmit (and, possibly, receive) wirelessly consistent with ZigBee, ZWave, or other common communications protocols. Preferably (although not necessarily), signals originating with one or both of devices 26A and 26B eventually are conveyed via the Internet for processing or consideration at a remote location. For example, information obtained using one or more of devices 26A and 26B could be forwarded to a smart phone, laptop, desktop, tablet computer, or other equipment of a homeowner or pool servicer for processing or consideration. Alternatively, the information may be conveyed directly (either wirelessly or via wire) to an on-board pump controller or other component.

If device 26A senses a rapid rise in vacuum (i.e. a rapid pressure decrease), for example, the strainer basket may be clogged with debris, inhibiting adequate water flow to the impeller. A decision to withdraw power from the motor of pump P may thus be made automatically or manually, remotely or nearby, based at least in part on information obtained from device 26A. Information from devices 26A and 26B additionally could be used to help determine flow rates of water through pump P as a function of time, energy usage of the pump P, and dynamic head of water to be pumped by pump P, etc., for conveyance to a homeowner, servicer, manufacturer, or otherwise via the Internet or otherwise.

Figure 3:
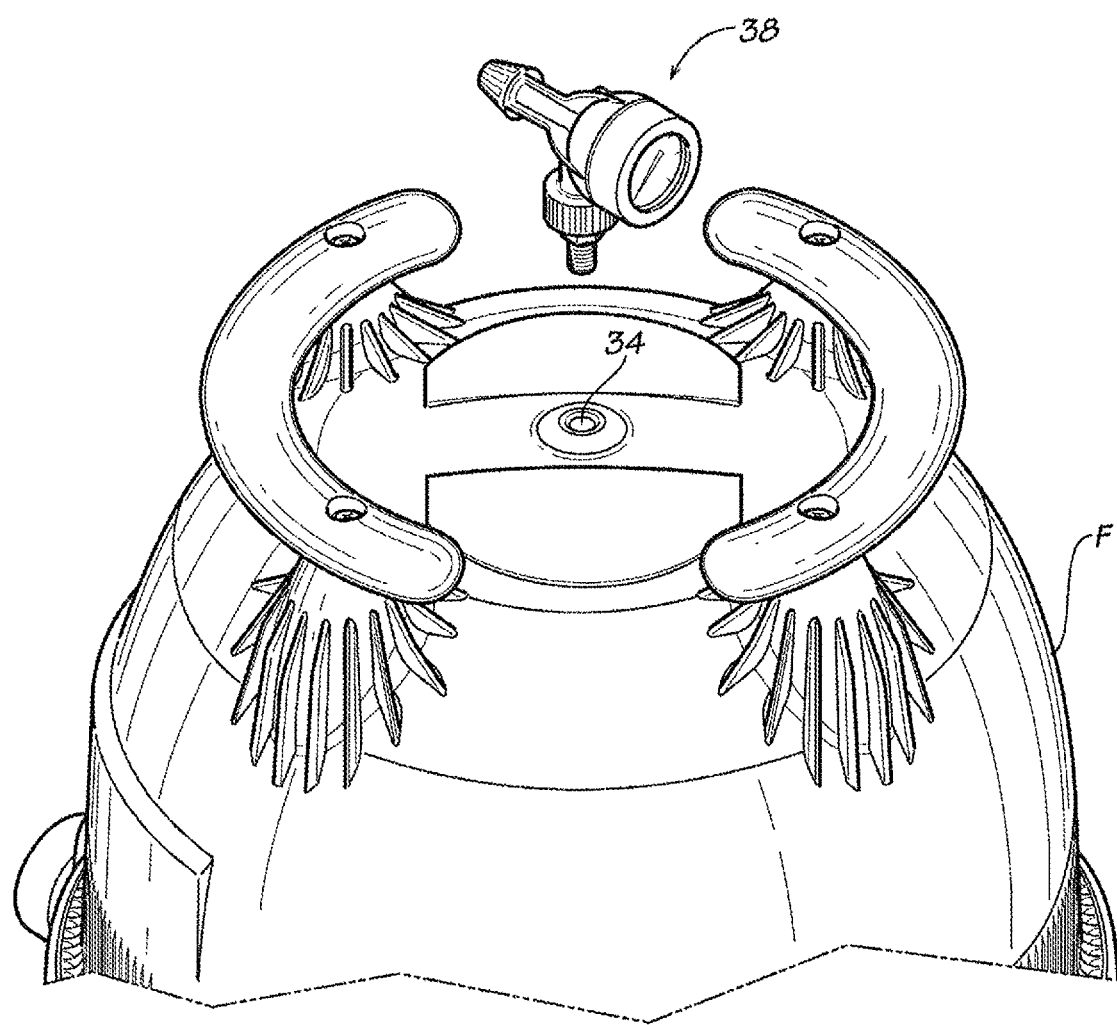
FIG. 3 is a perspective view of a portion of a filter useful as part of a pool water recirculation system together with an exemplary device of the present invention incorporated into a filter-loading gauge.
Figure 4:
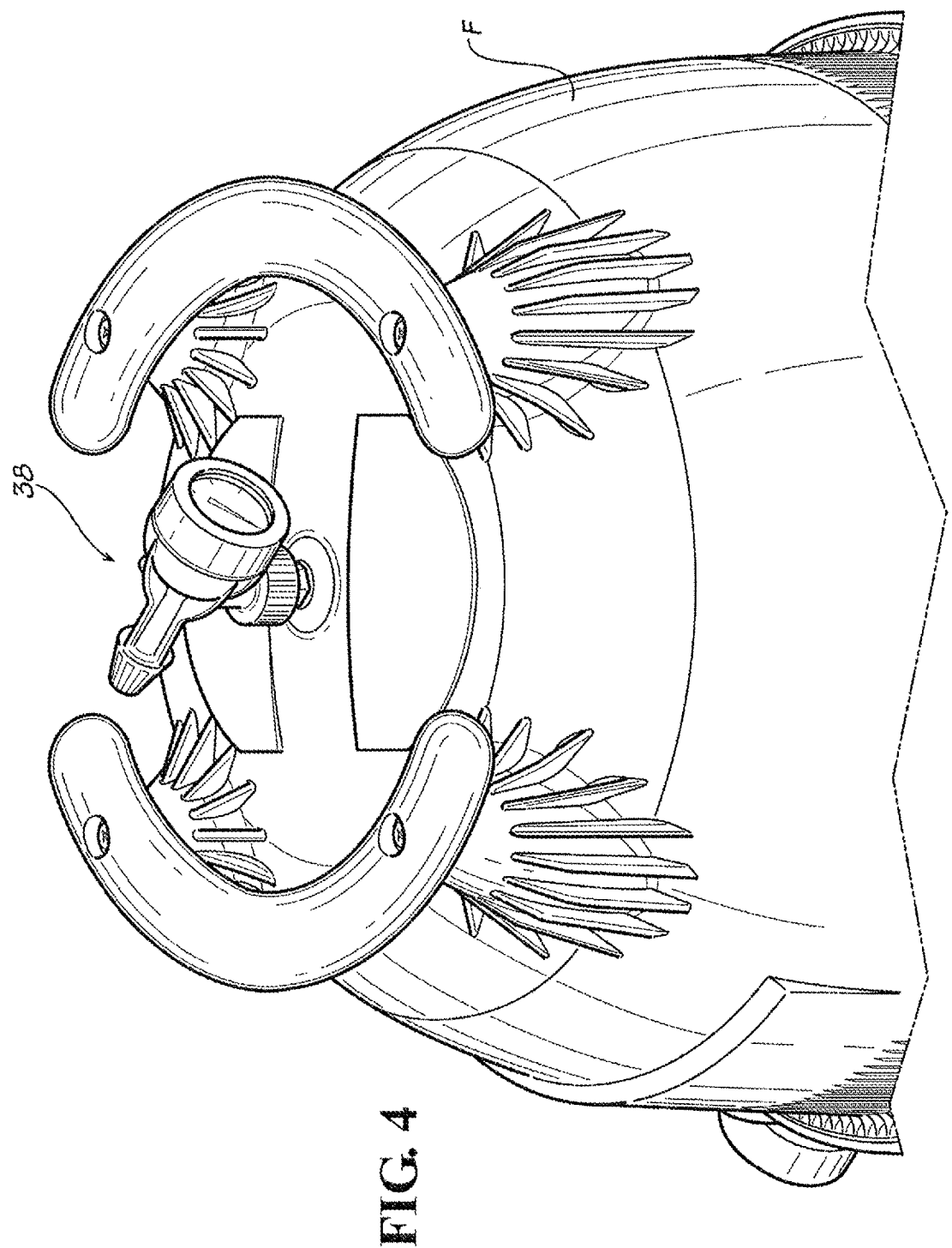
FIG. 4 is a perspective view of the portion of the filter of FIG. 3 with the exemplary device of that figure connected thereto.

As noted earlier, devices identical or similar to devices 26A or 26B may be used in connection with other pool or spa equipment. FIGS. 3-4 depict such usage in connection with filter F. The filter F may have port 34 into which conventionally a gauge is placed to indicate loading of the filter with debris over time. However, with the present invention, gauge 38 may include a transmitter as well as a debris-loading sensor. As with preferred versions of devices 26A and 26B, preferred embodiments of gauge 38 include low-powered devices with wireless RF transmitters configured for networking using any suitable communications protocol. Indeed, devices 26A and 26B and gauge 38 advantageously may form part of the same network when used in the same water-recirculation system. If any of devices 26A or 26B or gauge 38 includes a processor, information even may be conveyed among the devices and gauge themselves.

The foregoing is provided for purposes of illustrating, explaining, and describing embodiments of the present invention. Modifications and adaptations to these embodiments will be apparent to those skilled in the art and may be made without departing from the scope or spirit of the invention. For example, devices of the invention may sense information such as (but not limited to) temperature, flow, salinity, pH, ORP, FAC, turbidity, level, motion, gas trap characteristics, etc. Moreover, "pool," "swimming pool," and their plurals may include within their definitions spas and other water-containing vessels used for recreational or therapeutic bathing or swimming. The entire contents of the Uy and Stiles, Jr. patent applications are incorporated herein by this reference.

What is claimed is:

1. A method of determining a characteristic of a pump of a water circulation system of a pool or spa, the pump comprising a housing defining an inlet and an outlet, wherein a flow path is defined through the housing from the inlet to the outlet of the housing, the pump further comprising a filter within the housing, and an impeller within the housing, the method comprising:
   a. mechanically connecting a first device to the pump housing, the first device including a first pressure sensor and a first electronic transmitter, the first device configured to measure a first pressure at a first location within the housing at a location downstream from the inlet of the housing;
   b. mechanically connecting a second device to the pump housing, the second device including a second pressure sensor and a second electronic transmitter, the second device configured to measure a second pressure at a second location within the housing upstream of the outlet;
   c. electronically transmitting the first pressure obtained by the first pressure sensor to a location remote from the pump;
   d. electronically transmitting the second pressure obtained by the second pressure sensor to the location remote from the pump;
   e. receiving additional non-pressure data about the pump; and
   f. evaluating the transmitted first pressure, the transmitted second pressure, and the additional non-pressure data to determine the characteristic of the pump.

2. The method according to claim 1 in which the filter is a strainer basket within the pump.

3. The method according to claim 1, wherein the inlet comprises an inlet axis and the outlet comprises an outlet axis, and wherein the inlet axis and the outlet axis are not parallel.

4. The method according to claim 1, wherein the first device is configured to measure the first pressure on a pressure side of a wet end of the pump, and wherein the second device is configured to measure the second pressure on a vacuum side of the wet end of the pump.

5. A method of determining a characteristic of a pump of a water circulation system of a pool or spa, the pump comprising a housing defining an inlet and an outlet, wherein a water flow path is defined through the housing from the inlet to the outlet, the pump further comprising a filter within the housing, and an impeller within the housing, the method comprising:
   a. mechanically connecting at least one sensor to the housing;
   b. measuring, by the at least one sensor, a first pressure at a first location within the housing and a second pressure at a second location within the housing;
   c. electronically transmitting the first pressure obtained to a location remote from the pump;
   d. electronically transmitting the second pressure obtained to the location remote from the pump;
   e. receiving additional non-pressure data about the pump; and
   f. evaluating the transmitted first pressure, the transmitted second pressure, and the additional non-pressure data to determine the characteristic of the pump.

6. The method according to claim 5, wherein the additional non-pressure data comprises motor speed information about a motor of the pump.

7. A method of controlling pool equipment of a water circulation system of a pool or spa, the method comprising:
   a. measuring a first pressure at a first location of water flowing along a water flow path of the water circulation system;
   b. measuring a second pressure at a second location of water flowing along the water flow path of the water circulation system;
   c. receiving additional non-pressure data about the water circulation system;
   d. evaluating the first pressure, the second pressure, and the additional non-pressure data to determine a characteristic of the water circulation system; and
   e. controlling the pool equipment based on the determined characteristic of the water circulation system.

* * * * *